United States Patent
Card et al.

[19]

[11] Patent Number: 5,877,127
[45] Date of Patent: Mar. 2, 1999

[54] ON-THE-FLY CONTROL OF DELAYED BORATE-CROSSLINKING OF FRACTURING FLUIDS

[75] Inventors: Roger John Card; Kenneth H. Nimerick, both of Tulsa, Okla.; L. Jack Maberry; S. Bruce McConnell, both of Katy, Tex.; Erik Bentley Nelson, Broken Arrow, Okla.

[73] Assignee: Schlumberger Technology Corporation, Sugar Land, Tex.

[21] Appl. No.: 641,677

[22] Filed: May 1, 1996

Related U.S. Application Data

[63] Continuation-in-part of Ser. No. 314,119, May 31, 1994, abandoned, which is a continuation of Ser. No. 735,407, Jul. 24, 1991, abandoned.

[51] Int. Cl.[6] .............................. C09K 3/00; E21B 43/17
[52] U.S. Cl. ........................ 507/273; 507/209; 507/211; 507/217; 507/266; 507/922; 166/308
[58] Field of Search ..................... 507/922, 217, 507/211, 209, 266, 273; 166/308

[56] References Cited

U.S. PATENT DOCUMENTS

| | | | |
|---|---|---|---|
| 3,079,332 | 2/1963 | Wyant | 166/283 |
| 3,202,214 | 8/1965 | McLaughlin | 166/292 |
| 3,208,524 | 9/1965 | Horner | 166/294 |
| 3,215,634 | 11/1965 | Walker | 252/311 |
| 3,346,556 | 10/1967 | Foster | 536/52 |
| 3,411,580 | 11/1968 | McKinney et al. | 166/285 |
| 3,625,286 | 12/1971 | Porker | 166/292 X |
| 3,740,360 | 6/1973 | Nimerick | 523/131 |
| 3,766,984 | 10/1973 | Nimerick | 166/294 |
| 3,898,165 | 8/1975 | Ely et al. | 507/210 |
| 3,974,077 | 8/1976 | Free | 507/211 |
| 4,514,309 | 4/1985 | Wadhwa | 507/211 |
| 4,579,670 | 4/1986 | Payne | 507/211 |
| 4,619,776 | 10/1986 | Mondshine | 507/211 |
| 4,969,526 | 11/1990 | Cawiezel | 166/300 |
| 4,997,487 | 3/1991 | Vinson et al. | 106/804 |
| 5,082,579 | 1/1992 | Dawson | 507/203 |
| 5,145,590 | 9/1992 | Dawson | 507/211 |
| 5,160,445 | 11/1992 | Sharif | 507/203 |
| 5,160,643 | 11/1992 | Dawson | 507/268 |
| 5,211,859 | 5/1993 | Horton | 507/211 |
| 5,252,239 | 10/1993 | Eusebi | 252/75 |
| 5,259,455 | 11/1993 | Nimerick et al. | 166/308 |
| 5,271,466 | 12/1993 | Harms | 166/300 |
| 5,310,489 | 5/1994 | Sharif | 507/203 |
| 5,372,732 | 12/1994 | Harris et al. | 507/217 |
| 5,393,439 | 2/1995 | Laramay et al. | 507/211 |
| 5,445,223 | 8/1995 | Nelson et al. | 166/308 |
| 5,460,226 | 10/1995 | Lawson et al. | 166/300 |

FOREIGN PATENT DOCUMENTS 0528461    7/1992    European Pat. Off. .

*Primary Examiner*—Philip Tucker
*Attorney, Agent, or Firm*—John E. Vick, Jr.; Douglas Y'Barbo

[57] ABSTRACT

A method is provided for controlling the delay time of aqueous borate-crosslinked polysaccharide-based fluids for hydraulic fracturing and related applications which allows on-the-fly control of the delay time without comprising overall fluid integrity. Without having to modify the total boron content nor pH of the fracturing fluid, the delay time is controlled by adding a polyol to the fracturing fluid at a first rate, determining the resulting delay time and then adjusting the rate of the polyol addition to the fracturing fluid until the desired delay time is achieved.

26 Claims, 1 Drawing Sheet

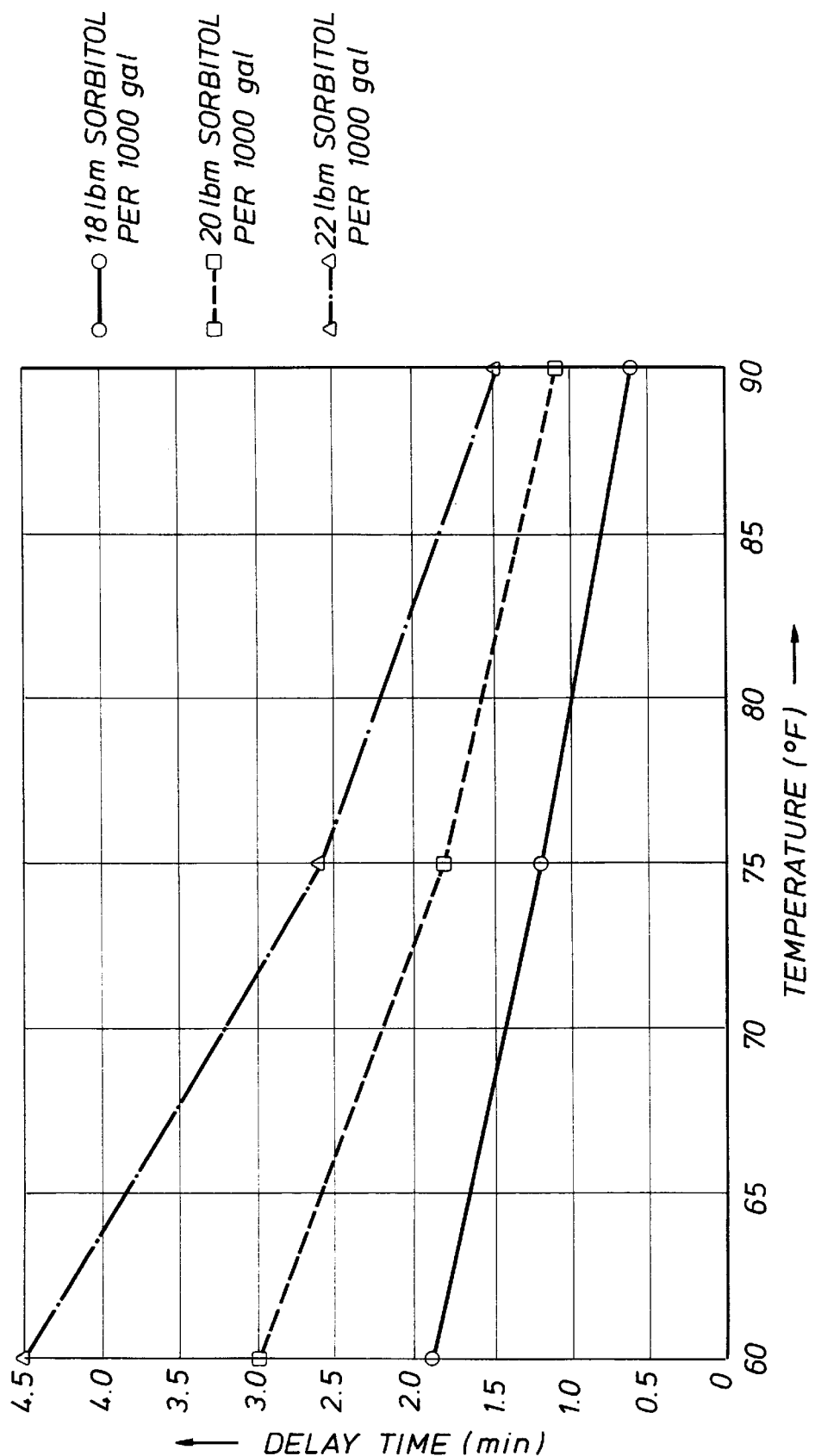

5,877,127

ON-THE-FLY CONTROL OF DELAYED BORATE-CROSSLINKING OF FRACTURING FLUIDS

This is a continuation in part of Ser. No. 08/314,119 filed on May 31, 1994 now abandoned, which is a continuation of Ser. No. 07/735,407 filed on Jul. 24, 1991 now abandoned.

FIELD OF THE INVENTION

This invention relates to crosslinked polymer gel compositions that may be used as fracturing fluids for oil and gas wells. More particularly, this invention relates to a method for controlling the delayed borate-crosslinking of fracturing fluids "on-the-fly", that is, as the fracturing fluid is being prepared and pumped down to the subsurface formation during the fracturing process.

BACKGROUND OF THE INVENTION

The use of boric acid or other boron containing materials to crosslink polysaccharides, e.g., guar, is known in the art. See U.S. Pat. No. 3,058,909 to Kern, issued Oct. 16, 1962. Such fluids in Kern were used for fracturing subsurface formations. In producing oil and gas, a well is drilled to a subsurface location where oil and/or gas may be present. Sometimes the formation in which the oil and/or gas are located do not allow the oil and/or gas to escape the formation up the oil well bore. One method to increase the amount of oil and gas produced is to make cracks extending out from the well bore into the subsurface formation. One way to do this is to pump a fluid at high pressures down into the well bore to crack the formation and force the fracturing fluid into those cracks. The fracturing fluid carries sand particles or other types of particles, which are called proppants, to hold the cracks open when the pressure is relieved. See the patent to Kern.

A problem encountered during fracturing and during other well operations is the loss of fluid circulation. For example, during fracturing, there may be encountered areas of high permeability, which is an area like a sponge having large holes through it which allow fluids to flow out of the formation into the well bore easily or from the well bore into the formation easily. As noted above, fracturing is used when fluids will not easily flow in or out of the formation. This is like a sponge with very small holes. When the holes get too small, oil for example will not want to come out of the subsurface formation. As noted above, fracturing is intended to make the holes bigger by forming cracks through the formation or increasing the surface area exposed to the well bore. However, if an area with large holes is encountered, pressure may not be maintained during the fracturing operation because the fluid which is being pumped down into the well bore is going into an area that has high permeability, i.e., larger holes, rather than the subsurface formation to be fractured. Sometimes, creating the cracks in the subsurface formation during fracturing may also cause lost fluid circulation. See U.S. Pat. No. 3,198,252 to Walker et al. at col. 1, lines 33–56, and col. 8, lines 36–37 ("[F]racturing creates additional fissures and thus aggravates lost circulation problems.").

Another problem encountered with fracturing operations is that the temperature increases the further down into the earth you go. In order to carry the sand particles used to keep the cracks in the subsurface formation open once they are fractured, the fracturing fluid needs to be able to carry these particles all the way down and into these cracks. One way of doing this is to increase the viscosity of the fracturing fluid, i.e., to make the fracturing fluid thicker. This is what Kern did by using a compound having boron such as boric acid. The boron, as borate ions, in the boric acid would attach to different molecules of guar to make the fluid thicker. The more boron as borate ions is present, the more guar molecules are attached together and the thicker the fluid.

Therefore, fluid viscosity and fluid stability are dictated by the concentrations of the polysaccharide and of borate ion. For a given borate ion concentration, increasing the amount of guar will increase fluid viscosity and will increase the amount of time for which that fluid can be held at a given temperature without significant loss of viscosity. The fluid is much more sensitive to the concentration of borate ion. If there is too little borate ion, no significant viscosity will be developed and the fluid will not be useful. If there is too much borate, the fluid becomes over-crosslinked, i.e., the guar reacts with the borate ions to form tight little balls of polymer in a water-thin fluid. This fluid has no effective viscosity and is not able to support and transport proppant. Thus, the borate ion concentration must be controlled within a very narrow window in order to have a viable fluid for hydraulic fracturing applications.

Another characteristic of the boron cross-linked guar is that it is sensitive to pH. As noted above, the bonds or ties between the boron and the guar molecule are in equilibrium. pH is a measure of how acidic or basic a fluid is. As the pH is made more basic, the boron is more inclined to attach itself to a guar molecule. As it becomes more acidic, the boron material tends to stay in the form of boric acid and does not attach itself to the guar molecule. A pH of 7 is said to be neutral. A pH greater than 7 is said to be basic and it goes all the way up to a pH of 14. A pH less than 7 is said to be acidic and extends to a pH of 1 (and even into negative numbers).

Though boron may be supplied in a variety of ways, it must be present as borate ions in order to serve as a crosslinker for polysaccharides, e.g., guar. According to D. J. Doonan and L. D. Lower ("Boron Compounds (Oxide, Acids, Borates)", in *Kirk-Othmer Encyclopedia of Chemical Technology*, Vol. 4, p. 67–110, 3rd ed., 1978), boric acid, borate ion and polyions containing various amounts of boron, oxygen, and hydroxyl groups exist in dynamic equilibrium where the percentage of each of the species present is dictated mainly by the pH of the solution. Borate ion begins to dominate the other boron species present in the fluid at a pH of approximately 9.5 and exceeds 95% of total boron species present at a pH of about 11.5. According to B. R. Sanderson ("Coordination Compounds of Boric Acid" in *Mellor's Comprehensive Inorganic Chemistry*, p. 721–764, ca. 1975), boron species (including borate ions and boric acid among others) react with di- and poly-hydroxyl compounds having a cis-hydroxyl pair to form complexes which are in rapid equilibrium with the uncomplexed boron species and the cis-hydroxyl compounds. The relative amounts of the complexed and free materials are provided by the equilibrium constants for the specific systems. The equilibrium constants for borate ion is several orders of magnitude larger (typically by factors of $10^4$ to $10^{10}$) than the equilibrium constant for boric acid with the same cis-hydroxyl compound. For all practical purposes, borate ions form complexes (i.e., can serve to crosslink polysaccharides), while boric acid does not. Therefore, in order to have a useable crosslinked polysaccharide fluid with the minimum boron content, most of the boron must be present as borate ions which requires a pH of at least about 8.5, preferably at least about 9.5. For example, in Kern in order to crosslink the guar with the boron, the pH was made basic, preferably between pH 8.5 to 12, when the boron compound is added to the hydrated guar. He adjusted the pH of the fluid by adding a base, specifically sodium hydroxide.

Unless a fluid is adequately buffered, pH will decrease with increasing temperature. (This is generally true of buffered fluids as well, it is just that the change in pH is much less severe for buffered fluids.) For a solution prepared with sodium hydroxide with a room temperature pH reading of 12, raising the temperature by 100° F. will decrease the pH by more than 1 unit. Since we are mostly interested in use above 200° F., the change in pH from the time it is prepared until it is at the maximum temperature in the reservoir will be greater than 1 pH unit, and could easily be as much as 2 or more pH units. This change is sufficient to cut the effective concentration of borate ions in half if we start at a pH of 11.5 or higher. It is enough to reduce the effective concentration of borate ions by a factor of 4 if we start at a pH of 10.5. The pH of the fluid prepared at the surface and the boron level must be specially controlled to provide the optimum fluid performance in the down hole environment.

One of the problems with boron acting as a tying agent or a cross-linking agent that ties two molecules of guar together is that the ability to form such attachments or bonds is sensitive to temperature. The bonds or the ties between the boron and the guar molecules is not a permanent bond, but is said to be in equilibrium. This means that it can undo itself and reattach itself at the same or another point of the guar molecule or with another molecule of guar. Further, the guar is like a coil of material. As it is heated, it relaxes and can extend itself. At some point, it becomes a little more difficult for the boron that is attached to one molecule of guar to find another molecule of guar to attach to.

One way of getting around this problem is by adding additional boron, batchwise or on-the-fly, to the system to increase the chances of the boron as a borate ion attaching two guar molecules together and maintaining the viscosity of the fracturing fluid to a point that it can still carry the sand particles into the cracks in the formation. However, adding additional boron to the fracturing fluid at the surface quickly and greatly increases the viscosity or thickness of the fluid and makes it very difficult to pump down the well bore requiring additional horsepower, thereby increasing the cost of the job. Further, using these higher pressures to pump the viscous fluid down the well bore increases the friction of the fracturing fluid against the well bore wall causing damage either to the well bore wall or to the fracturing fluid itself by being pulled apart as it is going down the well bore wall as a result of the friction. Accordingly, there was a need to delay the increase in viscosity needed down in the well bore so that the increased viscosity was not seen at the surface while the fluid was being pumped down into the well bore. Preferably, the increased viscosity happened close to the point where fracturing was to occur or at least to the point at which the temperature was sufficiently high that additional boron was needed to be released to maintain the viscosity of the fluid so that the sand would not fall out of the fracturing fluid. If the sand particles could not be sustained by the fracturing fluid, then they could not be placed within the cracks in the formation formed by the fracturing operation to maintain the cracks open after the pressure was released.

One way of delaying the cross-linking between the guar molecule and the boron was to use a slowly dissolving material. The material could be a slowly dissolving base (see, e.g., U.S. Pat. No. 3,974,077 to Free; used magnesium oxide as base or a wax-encapsulated base) or a slowly dissolving boron-containing material (see e.g., U.S. Pat. No. 4,619,776 to Mondshine). For example, with a slowly dissolving base, the pH would not be increased until the materials were further down the well bore. Accordingly, additional boron-containing material could be added at the surface but would not increase the viscosity or thickness of the fracturing fluid until the slow dissolving base dissolved and increased the pH to become basic and therefore encourage the boron containing material to crosslink or attach itself to the guar molecules. Alternatively, a slow dissolving boron-containing material could be used. The pH of the fracturing fluid could be made basic but since the boron-containing material was slowly dissolving, it would not increase the viscosity or thickness of the fracturing fluid until it got further down into the well bore and the boron-containing material dissolved. A modification of this was to use a solid boron-containing material that was coated or encapsulated in a material that would slowly dissolve, erode or melt away down in the formation as the temperature increased.(see, e.g., U.S. Pat. No. 3,898,165 to Ely which discloses the use of borax particles encapsulated by a paraffin wax for high temperature stability in fracturing fluids). Either way, a delay in the cross-linking or attachment of the borate ions provided by the boron-containing materials to the guar molecules was effected.

As noted above, the attachment of the boron materials to the guar molecules is also temperature sensitive. Further, the guar molecules, which are fairly long molecules, are all coiled up at lower temperatures such as temperatures experienced at the surface compared to temperatures experienced down in the well formation. Accordingly, at the surface there are fewer locations for the borate ions to attach themselves to guar molecules because the guar molecules are coiled up. Therefore, if additional boron material is added at the surface which provides borate ions in excess of that which will bind up the available sites on the guar molecules, then this excess would be available down in the well bore. In U.S. Pat. No. 3,215,634 to Walker, issued Nov. 2, 1965, he did just that, but added a polyhydric alcohol containing from 2 to 5 carbon atoms, for example, glycerol and ethylene glycol, to stabilize the fluid and reduce the fluid's sensitivity to temperature change. A polyhydric alcohol is an alcohol that has more than one "—OH" group which is called a hydroxyl group. Guar molecules have hydroxyl groups in them. Guar is like a long chain in which the various links of the chain are various molecules of simple sugars or sugar residues, i.e., what remains when sugar molecules are pulled apart (hereinafter referred to as "simple sugars") attached to each other. Simple sugars or sugar residues are also called monosaccharides. Certain of the simple sugars in the guar chain have pairs of hydroxyl groups that are in a "cis" orientation, i.e., parallel to each other and extend in the same direction. When a boron material attaches itself to a guar molecule, it attaches itself at a point where these two hydroxyl groups are located. Walker recognized this fact and utilized it to his advantage. He used polyhydric alcohols which had at least two hydroxyl groups in the same type of position that are presented in the guar molecule. Accordingly, since these hydroxyl groups are not tucked away within the coils of the guar molecule, they are readily accessible for binding or attaching to the excess boron present as borate ions that is available. This also keeps the guar molecules from becoming overly attached to each other through the borate ions such that the attached or cross-linked guar molecules tend to precipitate or fall out of solution. As noted above, the bonds or attachments between the boron and these hydroxyl groups are in equilibrium and attach and reattach to the same or other pairs of cis-hydroxyl groups. Accordingly, as the fracturing fluid continues down its journey within the well bore and the temperature increases, the guar molecules tend to uncoil exposing more hydroxyl groups. Since the borate ions attach and reattach themselves to these pairs of hydroxyl groups on the polyhydric alcohols or on the guar molecules, and the guar molecules are present in a greater concentration than the polyhydric alcohols, the boron tends to seek or finds more of the pairs of hydroxyl groups on the guar molecules to attach itself to. Accordingly, the viscosity or thickness of the fracturing fluid is maintained at a place down within the well bore by using the "reserve" of boron attached to the alcohol, rather than increasing the viscosity or thickness of the fluid at the surface to a point where it is difficult to pump or can damage the fluid or well bore on the way down.

It appears that the selection of the cis-hydroxyl alcohol and the amount to be used are important. In Walker (U.S. Pat. No. 3,215,634), glycerol and ethylene glycol are the preferred alcohols for this purpose. The general use of polyhydric alcohols as stabilizers for aqueous solutions of polysaccharides has been taught by Foster (U.S. Pat. No. 3,346,556). Sorbitol was one of the preferred stabilizers in this work. On the other hand, Freidman (U.S. Pat. No. 3,800,872) teaches that the addition of cis-hydroxyl alcohol containing compounds such as glycerol can result in formation of sufficient borate-glycerol complex to destroy the crosslinked structure of the fluid. Please note that glycerol is one of the preferred stabilizers in Walker.

As the foregoing illustrates, borate-crosslinked polysaccharide-based fluids for hydraulic fracturing have been used in the industry for more than 30 years. Having to deal with deeper wells has brought the temperature and pH sensitivity of such systems to the forefront as a problem needing to be addressed. Initial borate fluids were designed for use at temperatures below about 200° F. and developments concentrated on providing a fluid which was stable under the desired end use conditions. For example, the prior art discussed above for the most part was concerned with reservoir temperatures of about 150° F. See, e.g., Kern (concerned with fluid stability at about 150° F.), Wyant (U.S. Pat. No. 3,079,332; about 150° F.), and Walker (U.S. Pat. No. 3,215,634; maximum temperature tested was 141° F.). Since then, fluid systems been improved to allow use at temperatures above 200° F.

Dawson (U.S. Pat. Nos. 5,082,579; 5,145,590 (up to about 300° F.); U.S. Pat. Nos. 5,160,643), Sharif (U.S. 5,160,445; 5,310,489) and Harris (U.S. Pat. No. 5,372,732) teach the use of deliberately pre-formed organo-boron complexes as delay agents for borate crosslinked polysaccharide fluids for use above about 200° F.

As earlier noted, Mondshine (U.S. Pat. No. 4,619,776) teaches the use of slowly soluble inorganic boron sources to control the rate of boron availability. Mondshine also teaches the use of a combination of rapidly soluble boron source and slowly soluble boron source wherein the rapidly soluble boron source can provide some initial minimum viscosity with the slowly soluble boron source providing a "reserve" source of soluble boron to enhance the thermal stability of such fracturing fluids." This fluid was designed for use up to about 275° F.

All of the above methods of controlling delay time of borate crosslinked polysaccharide fluids for hydraulic fracturing applications suffer from the limitation that changing the delay time requires changes in the concentration of boron and/or of the pH of the fluid. These are the two main factors governing fluid stability. Therefore, changes in delay time require significant modification in fluid composition in order to provide the same fluid stability. As a result, it is difficult and/or potentially job threatening to modify the delay time of borate fluids on location in general, let alone during the course of the actual treatment when such optimization may be desirable. Further, the pre-formed organo-boron complexes and the fracturing fluids incorporating them are very sensitive and precise formulations. In such processes, it is therefore very important to perform comprehensive pre-job testing for successful fracturing.

Progress has been made both in improving fluid stability which is important at all temperatures as well as in methodology to control the onset of cross-linking (delay time) so that the fluid would develop the right viscosity for successful utilization at the right time in the life of the fluid. These aspects of fluid chemistry are interrelated. As a result, existing methods of providing borate fluids for use above about 200° F. typically compromise fluid viscosity and stability in order to obtain desired delay time.

SUMMARY OF THE INVENTION

A method is needed which allows control of delay time independent of control of involving the varying of pH and total boron concentration. We have developed a unique method of controlling the delay time of aqueous borate-crosslinked polysaccharide based fluids for hydraulic fracturing and related applications which allows on-the-fly control of fluid delay time without compromising overall fluid integrity. We have discovered a unique and simple way to provide this control. In a preferred embodiment, the fluid for hydraulic fracturing and related applications is prepared by combining three separate components: an aqueous solution of the hydrated polysaccharide, an aqueous solution of the boron source and the pH control agent, and an aqueous solution of a polyhydric alcohol which can form equilibrium concentrations of a boron complex. This discovery is surprising in light of the work of Friedman and of Deuel et al. (H. Deuel, H. Neukom, F. Weber, Nature, Jan. 17, 1948, p. 96—96) which teach that addition of polyhydric compounds, such as mannitol, fructose and glycerol which can form complexes with boron, to gels of boron and polysaccharides results in liquification, i.e., breaking of the gel and presumably, loss of their ability to transport proppant. It differs from the prior art of Dawson, Sharif and Harris in that a specific organo-boron complex is deliberately not pre-formed. Rather, each of the polysaccharide, boron-complexing agent and the polyol is kept separate until they are combined on-the-fly at the job site. This provides an additional degree of freedom by separately controlling the polyol concentration to control or vary the delay time experienced by the fluid. The friction pressure during the job or samples of the as combined fluid can be used to monitor delay time.

More particularly, there is provided a method for controlling the delayed borate-crosslinking of a polysaccharide-based fracturing fluid. The method comprises: providing a hydrated polysaccharide; adding a pH control agent to render the fracturing fluid alkaline; adding a crosslinking agent, wherein the crosslinking agent is capable of releasing at least one borate ion per molecule thereof in the fracturing fluid having an alkaline pH; adding a delay agent at a first rate to the fracturing fluid to provide a first delay time, wherein the delay agent is capable of complexing with the borate ions in the fracturing fluid having the alkaline pH and wherein the crosslinking agent and the delay agent are added separately to the fracturing fluid; determining the first delay time; comparing the first delay time to a predetermined desired delay time; and if the predetermined desired delay time is not substantially achieved, then continuing to adjust the delay agent adding step based upon the comparison to a different rate until the predetermined desired delay time is substantially achieved.

Alternatively, the method comprises: providing a polysaccharide; adding a first portion of a delay additive to the polysaccharide; hydrating the polysaccharide in the presence of the first portion forming a mixture of the hydrated polysaccharide and the first portion; adding a pH control agent to the mixture to render the fracturing fluid alkaline; adding, a crosslinking agent to the mixture, wherein the crosslinking agent is capable of releasing at least one borate ion per molecule thereof in the fracturing fluid having an alkaline pH; determining a first delay time; comparing the first delay time to a predetermined desired delay time; and if the predetermined desired delay time is not substantially achieved, then adding a second portion of the delay agent at a first rate to the fracturing fluid to provide a second delay time and continuing to adjust the second portion adding step based upon the comparison to a different rate until the predetermined desired delay time is substantially achieved, wherein the delay agent is capable of complexing with the borate ions in the fracturing fluid having the alkaline pH.

Further in the alternative, the method comprises: providing a hydrated polysaccharide; adding a pH control agent to render the fracturing fluid alkaline; providing a pre-formed boron/delay agent complex in the fracturing fluid, wherein the complex is prepared by combining in a alkaline solution (1) a crosslinking agent, wherein the crosslinking agent is capable of releasing at least one borate ion per molecule thereof in an alkaline environment, for example, in the alkaline solution and in the fracturing fluid having an alkaline pH, and (2) a first portion of a delay agent, wherein the delay agent is capable of complexing with the borate ions in the alkaline environment, again, for example, in the alkaline solution and in fracturing fluid having the alkaline pH; determining a first delay time; comparing the first delay time to a predetermined desired delay time; and if the predetermined desired delay time is not substantially achieved, then adding a second portion of the delay agent at a first rate to the fracturing fluid to provide a second delay time and continuing to adjust the second portion adding step based upon the comparison to a different rate until the predetermined desired delay time is substantially achieved.

DESCRIPTION OF THE FIGURE

FIG. 1 is a graph of delay time versus temperature using various amounts of sorbitol in a fracturing fluid.

DESCRIPTION OF THE PREFERRED EMBODIMENTS

The present invention is a continuous mixed process for combining a gelling agent, a crosslinking agent capable of yielding borate ions in an alkaline solution, a pH control agent and a polyol having at least 2 hydroxyl groups on adjacent carbons in a cis-orientation which is capable of complexing with borate ions in an alkaline solution. The method of the present invention controls the delay time of the crosslinking reaction between the gelling agent and the borate ions in an alkaline solution by controlling the amount of delay additive, i.e., the polyol. The amount of delay additive is varied by monitoring the delay time as evidenced by, for example, the friction pressure of the fracturing system and/or the delay time as determined by obtaining a sample of the fracturing fluid and performing the "hang lip" test thereon. In order to increase the delay time or reduce the friction pressure, the rate of delay additive addition is increased. Conversely, if the delay time is to be reduced and accordingly the friction pressure increased, the rate of delay additive addition is decreased. Accordingly, the concentration of boron and the pH of the fluid are determined prior to performing the job, typically by performing comprehensive pre-job testing. These variables determine or dictate the stability of the fracturing fluid in a primary sense. The delay time can be adjusted or fine tuned in the field during the fracturing job without compromising the primary stability factors of the fracturing fluid.

The gelling agent used in this invention is a high molecular weight water-soluble polysaccharide which contains cis-hydroxyl groups, which can complex with crosslinking agents such as aluminum, titanium, zirconium, antimony, chromium and borate. The most useful polysaccharides for the practice of this invention have molecular weights in the range of about 200,000 to 3,000,000. Galactomannan gum as employed herein refers to those natural occurring polysaccharides derived from various endosperms of seeds. They are primarily composed of D-mannose and D-galactose units. They generally have similar physical properties, such as being soluble in water to form thick highly viscous solutions which usually can be gelled (crosslinked) by the addition of such inorganic salts as borax. Examples of some plants producing seeds containing galactomannan gums include Tara, Huizache, locust bean, Pola verde, Flame tree, guar bean plant, Honey locust, Lucerne, Kentucky coffee bean, Japanese pagoda tree, Indigo, Jenna, Rattlehox, Clover, Fenergruk seeds and Soy bean hulls. The gum is provided in a convenient particulate form generally smaller than what will be retained on a No. 20 mesh sieve (U.S. Standard Sieve Series) but larger than that which passes through a No. 200 mesh sieve. Of these polysaccharides, guar and its derivatives are preferred. Specifically, these include guar gum, locust bean gum, karaya gum, carboxymethylguar, hydroxyethylguar, carboxymethylhydroxyethylguar, hydroxypropylguar (HPG), carboxymethylhydroxypropylguar, and combinations thereof. Guar is a branched copolymer composed of a mannose backbone with galactose branches.

The polysaccharides are generally provided to a blender in solid, powder form, or more typically, suspended in a hydrocarbon such as diesel or kerosene. When added to a neutral or acidic aqueous solution, the polysaccharides, e.g., galactomannan gum, hydrate to form a gel. Hydration of the polysaccharides, e.g., guar and HPG, will only take place under neutral or acidic conditions, that is, at a pH of about 7 or less. Under these pH conditions, no crosslinking of the polysaccharides will occur with borate ion. In order to effect borate crosslinking of guar and HPG, the pH must be raised to at least 8.5, preferably at least 9.5. This raising of the pH requirement has been exploited in the prior art to effect a delay in the crosslinking of polysaccharides by borate ion.

Since such polysaccharides, e.g. guar and HPG disperse readily at high pH, the water pH is preferably raised, for example, with a buffer during blending of the polymer powder and then the pH should be lowered to slightly acidic to maximize gelation and achieve higher base viscosity. This method significantly reduces the formation of "fish eyes" and produces a higher quality base gel. The gel mixing process can be simplified by using a slurried polymer, i.e., polysaccharides, (slurried in diesel, kerosene or any other non-solvent) instead of the polymer powder.

The crosslinking agent utilized in the present invention must be capable of yielding borate ions in an alkaline solution. Sparingly soluble borates such as alkaline earth metal borates, alkali metal alkaline earth metal borates, and combinations thereof are examples of suitable borate sources. Exemplary minerals which are representative of these broad classes of compounds are as follows:

| | |
|---|---|
| Probertite: | $NaCaB_5O_9 \cdot 5H_2O$ |
| Ulexite: | $BaCaB_5O_9 \cdot 8H_2O$ |
| Nobleite: | $CaB_6O_{10} \cdot 4H_2O$ |
| Gowerite: | $CaB_6O_{10} \cdot 5H_2O$ |
| Frolovite: | $Ca_2B_4O_8 \cdot 7H_2O$ |
| Colemanite: | $Ca_2B_6O_{11} \cdot 5H_2O$ |
| Meyerhofferite: | $Ca_2B_6O_{11} \cdot 7H_2O$ |
| Inyoite: | $Ca_2B_6O_{11} \cdot 13H_2O$ |
| Priceite: | $Ca_4B_{10}O_{19} \cdot 7H_2O$ |
| Tertschite: | $Ca_4B_{10}O_{19} \cdot 20H_2O$ |
| Ginorite: | $Ca_2B_{14}O_{23} \cdot 8H_2O$ |
| Pinnoite: | $MgB_2O_4 \cdot 3H_2O$ |
| Paternoite: | $MgB_8O_{13} \cdot 4H_2O$ |
| Kurnakovite: | $Mg_2B_6O_{11} \cdot 15H_2O$ |
| Inderite: | $Mg_2B_6O_{11} \cdot 15H_2O$ |
| Preobazhenskite: | $Mg_3B_{10}O_{18} \cdot 4\frac{1}{2}H_2O$ |
| Hydroboracite: | $CaMgB_6O_{11} \cdot 6H_2O$ |
| Inderborite: | $CaMgB_6O_{11} \cdot 11H_2O$ |

-continued

| Kaliborite (Heintzite): | $KMg_2B_{11}O_{19} \cdot 9H_2O$ |
|---|---|
| Veatchite: | $SrB_6O_{10} \cdot 2H_2O$ |

The most preferred borate sources are those that yield the highest concentration of borate ions in solution and are rapidly soluble in a solution of hydrated polysaccharide, e.g. alkali metal borates. Exemplary compounds which fulfill these requirements are borax, sodium tetraborate and boric acid. Another useful borate source is Polybor, a product of U.S. Borax Company, which comprises a proprietary composition comprising boric acid and dimers and trimers of borate ions. Further, various combinations of these borate sources may be used.

A pH control agent should be employed to maintain the pH of the fracturing fluid at a value of at least about 8.5, preferably at least about 9.5, and more preferably between about 9.5 and 12. A hydroxyl ion releasing material and/or preferably a buffering agent can be employed.

The hydroxyl ion releasing agent may be any soluble or partially soluble hydroxide or carbonate that provides the desirable pH value in the fracturing fluid to promote borate ion formation and crosslinking with the polysaccharide and polyol. The alkali metal hydroxides, e.g., sodium hydroxide, and carbonates are preferred. Other acceptable materials are $Ca(OH)_2$, $Mg(OH)_2$, $Bi(OH)_3$, $Co(OH)_2$, $Pb(OH)_2$, $Ni(OH)_2$, $Ba(OH)_2$ and $Sr(OH)_2$. At temperatures above about 175° F., potassium fluoride (KF) is used to prevent the precipitation of MgO when $Mg(OH)_2$ is used as a base, i.e., hydroxyl ion releasing agent. The amount of the hydroxyl ion source to provide is that which is sufficient to yield a pH value in fracturing fluid of at least 8.5, preferably at least about 9.5, and more preferably between about 9.5 and about 12.

A buffering agent is preferably employed in the practice of the present invention, to buffer the fracturing fluid, i.e., moderate amounts of either a strong base or acid may be added without causing any large change in pH value of the fracturing fluid. The buffering agent may be a combination of a weak acid and a salt of the weak acid; an acid salt with a normal salt; or two acid salts. Examples of suitable buffering agents which may be employed to provide a fracturing fluid having the desired pH value are $NaH_2PO_4$—$Na_2HPO_4$; sodium carbonate-sodium bicarbonate; and sodium bicarbonate, or other like agents. By employing a buffering agent instead of merely a hydroxyl ion producing material, a fracturing fluid is provided which is more stable to a wide variance of pH values found in local water supplies and to the influence of acidic materials located in formations and the like. The pH control agent may be varied between about 0.6 percent and about 40 percent by weight of the polysaccharide employed.

As noted above, a variety of boron salts and compounds can be used to crosslink galactomannan based fracturing fluids, but the monoborate ion formed from these materials is the species that causes gelation. The monoborate ion is the primary conjugate base of boric acid (Eq. 1) at concentrations less than 0.30% (wt) or 0.048M.

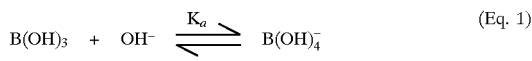

(Eq. 1)

The dissociation constant, $pK_a$, of the reaction shown in Eq. 1 is 9.0–9.2, indicating that the monoborate ion is favored in alkaline solutions.

In aqueous solution, boric acid forms an adduct with one water molecule. The central boron atom is surrounded by four oxygen atoms. The same tetrahedral configuration is also true for borate esters. Both 1:1 and 2:1 complexes of borate ion are formed at high pH. Consequently, borate esters of diols (Eqs. 2 and 3) are found in the region where $pH > pK_a$ (boric acid).

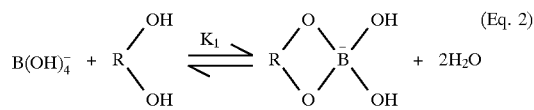

(Eq. 2)

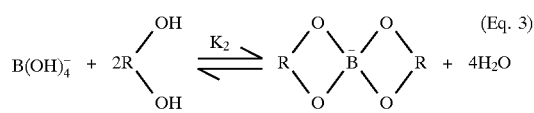

(Eq. 3)

In the hydrated polysaccharide systems, R of Eqs. 2 and 3 denotes, for example, the mannose backbone of the guar polymer. Production of a good borate crosslinked gel fluid at a given temperature involves the combination of a polymer having a specific number of crosslink sites with the proper number of crosslinking ions in solution to build a network structure.

At a pH of at least 8.5, particularly at a pH of at least 9.5, cross-linking is instantaneous when borate is added to a hydrated guar fluid. To delay the crosslink in high-pH fluids, the method of the present invention incorporates a polyhydric alcohol, or polyol, which like guar contains cis-hydroxyls. Therefore, a complex with monoborate ion similar to Eq. 3 can be formed. For example, up to 275° F., the addition of 15 to 40 lb./Mgal. sodium gluconate can provide up to 6 minutes crosslink delay with sufficient fluid stability (usually >500 cp. apparent viscosity for a period up to 3 hours). Experimentation at temperatures higher than 275° F. has shown that it is possible to obtain sufficient crosslink delay with sodium gluconate. However, the viscosity of the fluid deteriorates rapidly.

A compilation of the equilibrium data for various polyols is given in Table 1. Up to four constants were found in the literature. The constants $k_1$ and $k_2$ correspond to Eqs. 2 and 3, respectively. For the same equilibria written as involving boric acid, it follows that the respective equilibrium constants $k'_1$ and $k'_2$ are:

$$k'_1 = k_a k_1 \text{ and } k'_2 = k_a k_2$$

With the exception of gluconic acid and guar, the constants for the ligands were taken from data compiled from various sources by Sanderson, and Martell and Smith. Consequently, the mathematical relationships between them as shown above are not always coherent. (See B. R. Sanderson, "Coordination Compounds of Boric Acid," *A Comprehensive Treatise on Inorganic and Theoretical Chemistry*, J. W. Mellor, ed., Section A18, Longmans, London, pages 721–64 (1974), and A. E. Martell and R. M. Smith, *Critical Stability Constants*, Plenum Press, New York (1974)). The constants for gluconic acid and guar were measured experimentally using high-resolution boron NMR. Note that the $k_2$ for guar is less than the $k_1$ and $k_2$ for gluconate. This implies that, from a purely thermodynamic point of view, gluconate should not release boron to the guar. However, the eventual viscosification of the fluid shows that boron must be released to some extent.

The most relevant constant in terms of the crosslinking reaction is $k_2$. However, $k_1$ may have an impact on the crosslink delay and fluid stabilization. It is very important to note that the constants reported in Table 1 are quoted at 25° C., and one cannot assume that the same relationships between the ligands would exist at 300° F.

TABLE 1

Equilibrium Constants for the Formation of Boric Acid Complexes from Various Polyols at 25° C.

| Ligand | $k'_1$ | $k'_2$ | $k_1$ | $k_2$ |
| --- | --- | --- | --- | --- |
| arabinose | — | — | — | $1.45 \times 10^4$ |
| D-fructose | $3.75 \times 10^{-6}$ | $8.67 \times 10^{-5}$ | $3.00 \times 10^3$ | $1.24 \times 10^5$ |
| D-galactose | $1.64 \times 10^{-7}$ | $1.94 \times 10^{-7}$ | $1.75 \times 10^2$ | $4.28 \times 10^2$ |
| D-glucose | $1.87 \times 10^{-7}$ | $5.74 \times 10^{-7}$ | $1.50 \times 10^2$ | $7.60 \times 10^2$ |
| D-mannitol | $1.00 \times 10^{-4}$ | $1.29 \times 10^{-5}$ | $5.60 \times 10^2$ | $2.75 \times 10^6$ |
| D-mannose | — | — | $1.02 \times 10^2$ | $4.58 \times 10^2$ |
| L-rhamnose | — | — | — | $4.09 \times 10^2$ |
| D-ribose | — | — | — | $1.57 \times 10^7$ |
| D-sorbitol | — | — | — | $4.44 \times 10^5$ |
| xylose | — | — | — | $1.58 \times 10^4$ |
| glucomc acid | — | — | $8.77 \times 10^2$ | $3.70 \times 10^4$ |
| guar | — | — | — | $1.26 \times 10^4$ |

As used in this specification, the terms "polyhydric alcohols" or "polyols" will be understood to mean an organic compound having adjacent hydroxyl groups in a cis-orientation, i.e., cis-hydroxyls. Thus, the polyol may comprise such materials as saccharides, including monosaccharides, oligosaccharides having a molecular weight up to about 2,000, and polysaccharides including natural and synthetic gums. Also included in the term "polyols" are the acid, acid salt, ester, hydrogenation and amine derivatives of the polyol so long as the polyol has and continues to have at least one set of cis-hydroxyl groups. For example, glucose is a monosaccharide. Monosaccharides are any of several simple sugars having the formula $C_6H_{12}O_6$. Gluconic acid is the acid derivative of glucose. A gluconate, for example sodium gluconate, is the acid salt of gluconic acid. Accordingly, a gluconate is the acid salt derivative of a saccharide. Mannitol and sorbitol are both hexahydric alcohols with one hydroxyl group per carbon atom. Mannitol is derived by hydrogenating glucose, i.e., by hydrogenating the —CH=O group of glucose to the —CH$_2$—OH of mannitol. Sorbitol has the same number of carbons, hydrogens and oxygens as mannitol. One of the —OH's is arranged in the opposite direction from that of mannitol. Sorbitol is derived by pressure hydrogenation of dextrose (another name for glucose) with nickel catalysts. Accordingly, mannitol and sorbitol are both hydrogenation derivatives of glucose which is a monosaccharide or, generically, a saccharide.

Suitable polyols are those that provide adequate delay time and stabilize the fracturing fluid at the end use conditions of the fracturing process. Suitable polyols are preferably those that have an equilibrium constant ($K_{eq}=k_2$ at 25° C.) of at least $10^3$, preferably at least $10^4$. Examples of such suitable polyols include fructose, sorbitol, gluconic acid and salts thereof, e.g., sodium gluconate, glucoheptonic acid and salts thereof, e.g., sodium glucoheptonate, mannitol, ribose, arabinose, and xylose. Polyols which have been demonstrated not to be suitable in the method of the present invention include glucose, ethylene glycol, glycerol, mannose, and rhamnose. Each of these materials have a $K_{eq}$ less than $10^3$. One polyol which is not as preferable is galactose. Though this material has a $K_{eq}$ on the order of $10^2$, it appears to have some utility in the present method. This may be due to the fact that galactose has two sets of cis-hydroxyl groups. The monosaccharides demonstrated to be useful in the present invention have at least 6 carbon atoms.

The method of the present invention is preferably used in situations where the reservoir temperature ranges from about 175° F. to about 350° F., though it may be used for any temperatures below 175° F. also.

A degradation agent is optionally employed to predictably degrade the set gel, i.e., borate-crosslinked polysaccharide, after a predetermined period of time. The degradation agents are generally either enzymes or oxidizing agents. The specific degradation agent employed will depend on the temperature to which the set gel is subjected. At temperatures ranging from about 125° to 200° F., an inorganic breaker or oxidizing agent, e.g., KBrO$_3$, and other similar materials, e.g., KClO$_3$, KIO$_3$, peroxides, perborates, persulfates, permanganates (for example, ammonium persulfate, sodium persulfate, and potassium persulfate) and the like, are used to control degradation of the gel structure of the set gel. At temperatures ranging from about 60° to 140° F., an enzyme may be employed. Enzymes suitable for this purpose are those which catalyze the hydrolysis of the glycosidic bonds between the monomer units of the polysaccharide. The selection of a suitable enzyme for a particular polysaccharide, e.g., galactomannan, gum can be determined from references well known in the art, see for example Smith and Montgomery, The Chemistry of Plant Gums, Monograph Series, No. 141, 1959, pp. 151–156. The amount of enzyme employed in any particular gel solution as defined herein will depend on the amount of galactomannan gum present, and also upon the temperature and pH to which the set gel is to be subjected. Generally, about 0.01 to 2.0 percent by weight of enzyme of the weight of gum employed is satisfactory. At about 200° F. and above, typical breakers include sodium bromate. It is noted, however, that formation or connate water usually has a pH ranging from 6 to 8 which helps break the crosslink junctions, thus aiding in fracturing fluid recovery. Further, temperatures of 200° F. and higher assist in thermally degrading the gelling agent.

Fluid-loss control agents are optionally employed in the practice of the invention. The preferred material is silica flour (particles having an average size of about 1 to 10 microns). However, any substantially inert organic or inorganic pulverulent material (including starches and the like) or combinations thereof may be employed as the fluid-loss control additive.

The fracturing fluids of this invention may also contain surfactants, propping agents, clay control chemicals, concentrations of salts which are compatible with the gelling agent, and oxygen scavengers.

In a preferred embodiment of the present invention, the process begins with the preparation of a hydrated guar solution in a tank. Water is added to a diesel slurry of guar in the tank and the guar is allowed to hydrate in the tank for a period of four to seven minutes. The pH of the hydrated guar solution is about 7 (close to neutral) to permit the guar to hydrate properly without introducing a significant amount of insoluble material into the guar solution.

At least two other storage tanks, each having a separate metering pump, contain (1) an aqueous solution containing a borate cross-linking agent and a pH control agent and (2) an aqueous solution of the polyol, e.g. sorbitol.

The borate/pH solution typically is an aqueous solution formed by combining boric acid with sodium hydroxide and a carbonate buffer in an aqueous solution. The boric acid converts to a borate salt in the solution. Although readily soluble in water, boric acid has a relatively poor cross-linking capability when compared with soluble borate salts. The relative cross-linking rates between boric acid and sodium borate (borax, Na$_2$[B$_4$O$_5$(OH)$_4$]•8H$_2$O) differ by more than four orders of magnitude (i.e., sodium borate is more than 10,000 times more active than boric acid for this purpose). See B. R. Sanderson, supra.

Each of the two also can be varied independently over time during the fracturing operation.

The hydrated guar solution is introduced into a pipe, for example, having an eight inch diameter. The pipe also has a series of separate, but relatively closely spaced, inlets for each of the borate/pH control and polyol solutions. The pipe in combination with these inlets serves as a manifold for combining the hydrated guar solution with each of the two additive solutions. Each of the two additive solutions is injected directly into the guar solution; neither of the additives contacts any other additive before being combined with the guar solution. However, the relatively close spacing of the inlets results in a mixing of all of the additives with the guar solution quickly after being introduced into the guar solution to form a combined solution.

The combined solution, which now constitutes the fracturing fluid, is then pumped to a second truck, in which proppant material is added. After the addition of the proppant material, the fracturing fluid is pumped into the well.

Well temperature generally increases with depth. Thus, as the fracturing fluid is pumped into the well and travels down the wellbore to the subsurface formation to be fractured, it is heated by the increasing temperature gradient in the well. Heating of the fracturing fluid has the effect of reducing its effective pH. Generally, the target pH for the fracturing fluid as it is entering the subsurface formation is in the range of about pH=9.5±0.5. To achieve this bottom hole target pH, the fracturing fluid (for use about 200° F.) typically will have a pH in the range of about pH=12±1 at the surface when it is pumped into the well, depending on the surface temperature, the bottom hole temperature, and the desired bottom hole pH.

In the present process, the relative concentrations of the boron and the hydroxide (used to control pH) are determined in advance based on the bottom hole temperature and the projected length of time of the fracturing job (higher bottom hole temperature may require a higher concentration of hydroxide, and a longer projected fracturing job time may require a higher concentration of boron).

The polyol is added to the fracturing fluid for two purposes; (1) stabilizing the viscosity of the fracturing fluid against decay over time, and (2) retarding of the cross-linking of the guar polymer.

It is contemplated within the scope of this invention that each of the crosslinking agent, pH control agent and delay additive be added separately to the fracturing fluid on-the-fly. In an alternate embodiment, the delay additive may be added in two ways: (1) the first portion being added to the polysaccharide at or before the hydration of the polysaccharide with (2) a second portion metered into the fracturing fluid on-the-fly to fine tune the delay time in an increasing manner.

In the method of the present invention, the only limitation to the sequence of addition of the various components of the fracturing fluid is that the complexing agent be added to the polysaccharide after it has been hydrated. Further, the delay additive is preferably added at such a time to avoid the possibility of overcrosslinking the hydrated polysaccharide upon addition of the crosslinking agent thereto.

In another alternate embodiment, a complex of the boron and polyol may be pre-formed and added to the fracturing fluid to attain a minimum delay time with fine tuning of the delay time available by the separate addition of additional polyol to achieve greater delay times than the minimum achieved by incorporating the pre-formed boron/polyol complex. For example, the polyols suitable in the present invention may be used to pre-form the boron/polyol complex by prior mixing or combination thereof with the complexing agent useful herein under alkaline conditions. See, for example, U.S. application Ser. No. 08/314,119 filed May 31, 1994 of Brian R. Ainley, et al., entitled "Delayed Borate Crosslinked Fracturing Fluid," which is hereby incorporated by reference. The method of the present invention would also be suitable to fine tune by increasing the delay time in a fracturing fluid utilizing the delay crosslinking agents disclosed in U.S. Pat. No. 5,372,732 to Harris et al.

Stabilization of the fracturing fluid is desirable because of the length of time which a well fracturing job may take, which can vary from about half an hour to eight hours or more. Typically, it is desirable for the fluid entering the subsurface formation to have a fairly constant viscosity during the entire time the fluid is being pumped into the formation to fracture the formation. However, without the addition of a stabilizer, i.e., the polyol, the viscosity of the fracturing fluid ordinarily would decay (decrease) over time. Generally, it is not desirable for the viscosity of the fracturing fluid to decrease until after the fracturing operation has been completed.

A large number of organic compounds are able to form complexes with boron. Of these, mono, -di- and poly-hydroxyl compounds have received the most study. Lists of potentially useable materials are found in Steinberg and Hunter (*Industrial and Engineering Chemistry*, Vol. 49 [Feb. 1957] p. 174–181) and R. B. Sanderson (supra). However, as shown by the following examples, very few of these materials can provide the combination of delay time and fluid stability required for hydraulic fracturing applications. As noted earlier, the primary stability factors of the fracturing fluid are the concentration of boron and the pH of the fluid. In regard to the polyol, suitable polyols perform a secondary fluid stability function, i.e., to maintain the fluid's stability or at least minimize the rate of stability degradation during the fracturing process.

The examples below are based on water-based fluids. The method of the present invention also can be used with aqueous fluids containing a water-soluble alcohol having 1 to 3 carbon atoms, e.g., methanol and ethanol, as co-solvents.

When sea water is used to makeup the fracturing fluid, i.e. when the base fluid in which the polysaccharides, e.g., guar, is dispersed and hydrated is sea water, the solution comprising the boron-containing compound and the pH control agent or the pH control agent alone, of necessity includes a significantly larger amount of pH control agent in order to raise the pH of sea water at the elevated temperatures. As noted earlier, any common base such as an alkali metal or ammonium hydroxide or an alkaline earth metal hydroxide may be used as the pH control agent to adjust the pH.

EXAMPLES

Example 1

A base fracturing fluid comprising 40 pounds of guar per one thousand gallons of fracturing fluid was prepared and was allowed to hydrate. The fracturing fluid contained minor amounts of conventional fracturing fluid additives such as a surfactant (usually a proprietary blend of nonionic surfactants), biocide (typically alkylhyroxyethyl benzyl ammonium chloride) and an antifoam agent (typically a polyether polyol). In this example, triethanolamine iron control agent and sodium thiosulfate antioxidant were also present. To this solution was added 5 pounds of boric acid and 20 pounds of sodium hydroxide per one thousand gallons of fluid. The fluid pH was 12.2 at 22° C. The fluid was mixed in a Waring blender until vortex closure was observed. Delay time was then determined by the hang lip method. Delay time was ten seconds.

This example provides the control study without delay agents.

Examples 2–21

Examples 2–21 were performed in the manner of Example 1 with the exception that polyols were added and tested for suitability as delay agents (see Table 2). The pH in these examples was usually above 12 because these fluids were to be evaluated for stability at temperatures above 275° F. Examples 2–10 illustrate that well-known chelants for boron are not acceptable at these concentrations for this application. In many cases, these materials destabilize the resulting fluids as expected from the prior art. Examples 11–21 demonstrate that some, but not all sugars or monosaccharides can be used as delay agents. These agents typically have a $K_{eq}$ greater than about $10^3$. These examples demonstrate the sensitivity of the delay time to the concentration of the polyol at relatively low levels of the polyol, even at relatively constant pH.

glucose, all of which have $K_{eq}$ in the range of $10^2$, are not effective delay agents at these concentrations. Though galactose (Example 30) has a $K_{eq}$ in the range of $10^2$, it is marginally effective as a delay agent at this concentration.

TABLE 2

| EXAMPLE NUMBER | POLYOL | POLYOL Boron (mole ratio; x:1) | Boric Acid/ Sodium Hydroxide (lb./Mgal.) | pH | DELAY TIME (min.:sec.) | $K_{eq}$** |
|---|---|---|---|---|---|---|
| 1. | None | — | 5/20 | 12.2 | 0:10 | — |
| 2. | Ethylene glycol | 2 | 5/20 | 12.5 | 0:10 | $10^1$ |
| 3. | Glycerol | 2 | 5/20 | 12.5 | 0:10 | $10^1$ |
| 4. | Citric Acid | 2 | 5/20 | 7.7 | 0:00 | |
| 5. | Tartaric Acid | 2 | 5/20 | 11.3 | 0:18 | |
| 6.* | Ethylenediamine tetraacetate | 2 | 5/20 | 12.3 | 0:15 | |
| 7.* | Hexaethylenediamine tetraacetate | 2 | 5/20 | 9.1 | 0:00 | |
| 8.* | 1-Hydroxyethylidene-1,1-diphosphonic acid | 2 | 5/20 | 9.3 | 0:10 | |
| 9.* | Hexamethylenediamine-tetra (methylenephosphonic acid) | 2 | 5/20 | 12.3 | 0:15 | |
| 10.* | Diethylenetriaminepenta (methylenephosphonic acid) | 2 | 5/20 | 12.3 | 0:10 | |
| 11. | Glucose | 1 | 5/20 | 12.1 | 0:20 | $10^2$ |
| 12. | Glucose | 2 | 5/20 | 12.4 | 0:30 | $10^2$ |
| 13. | Sodium Gluconate | 1 | 5/20 | 12.3 | 1:12 | |
| 14. | Sodium Gluconate | 2 | 5/20 | 12.5 | 15:50 | |
| 15. | Fructose | 1 | 5/20 | 12.4 | 1:00 | $10^5$ |
| 16. | Fructose | 2 | 5/20 | 12.1 | 2:10 | $10^5$ |
| 17. | Fructose | 4 | 5/20 | 12 | 39:00 | $10^5$ |
| 18. | Sorbitol | 1 | 5/20 | 12.2 | 1:10 | $10^5$ |
| 19. | Sorbitol | 2 | 5/20 | 13.4 | 57:00 | $10^5$ |
| 20. | Glucoheptonic acid | 2 | 5/20 | 12.2 | 2:30 | — |
| 21. | Glucoheptonic acid | 4 | 5/20 | 12.2 | >60 | — |

*These materials are not polyols, but are other types of chelating agents.
**Order of magnitude only. See B. R. Sanderson, "Coordination Compounds of Boric Acid," Mellor's Comprehensive Inorganic Chemistry, p. 725 (Table I, $k_2$) and p. 727 (Table II, $k_2$), Ca. 1975.

Examples 22–34

Examples 22–34 provide evaluation of a number of polyols as delay agents for fluids prepared in the manner of Example 2 with the exception that the guar concentration was increased to 50 pounds per one thousand gallons of fluid (see Table 3). These examples include a broader variety of polysaccharides. Examples 29–31 show that mannose and This may be because galactose has two sets of cis-hydroxyl groups. Examples 22–28 and 32–34 show that fructose, sorbitol, glucoheptonic acid and mannitol, which have $K_{eq}$ above $10^3$, are effective at these concentrations. Examples 23–28 demonstrate that doubling the boron level has a strong effect on delay time but that doubling the amount of sodium hydroxide does not produce as significant a change.

TABLE 3

| EXAMPLE NUMBER | POLYOL | POLYOL: Boron (mole ratio; x:1) | Boric Acid/ Sodium Hydroxide (lb./Mgal.) | pH | DELAY TIME (min.:sec.) | $K_{eq}$** |
|---|---|---|---|---|---|---|
| 22. | Fructose | 3 | 10/22 | 12.1 | 13:30 | $10^5$ |
| 23. | Sorbitol | 2 | 5/20 | 12.2 | 17:00 | $10^5$ |
| 24. | Sorbitol | 2 | 10/20 | — | 0 | $10^5$ |
| 25. | Glucoheptonic acid | 4 | 5/10 | 12.2 | 41:24 | |
| 26. | Glucoheptonic acid | 2 | 10/10 | 12.3 | <1:00 | |
| 27. | Glucoheptonic acid | 4 | 10/10 | — | >60 | |
| 28. | Glucoheptonic acid | 2.5 | 10/20 | — | 3:40 | |
| 29. | Mannose | 3 | 10/20 | 12.3 | <0:30 | $10^2$ |
| 30. | Galactose | 3 | 10/20 | 12.5 | 2:05 | $10^2$ |
| 31. | Glucose | 3 | 10/20 | 12.9 | 0:20 | $10^2$ |
| 32. | Mannitol | 3 | 10/20 | — | >60 | $10^5$ |
| 33. | Mannitol | 2 | 10/20 | — | 5:00 | $10^5$ |
| 34. | Mannitol | 1 | 10/20 | — | 0:20 | $10^5$ |

Examples 35–62

Examples 35–62 were performed in the manner of Example 22 with the exception that sodium gluconate was present in addition to a second polyol (see Table 4). These examples illustrate that a mixture of polyols can be used in this application. Examples 35 and 36 are repeat runs with sodium gluconate and no other polyol as a control. Under these conditions, sodium gluconate alone is not a viable delay additive, but these conditions were meant for fluids for use above about 300° F. Example 52 illustrates that rhamnose ($K_{eq}$ ca. $10^2$) is not as effective as sorbitol at this concentration. Examples 53–55 demonstrate that ribose can be used in this application. Ribose has a $K_{eq}$ on the order of $10^7$.

These examples demonstrate that glyoxal cannot be used in place of sorbitol in this process to obtain either an acceptable delay time or a stable fluid. Cooking of the glyoxal-boron solution to yield a pre-formed borate/glyoxal complex as taught by Dawson appears to be essential to the successful use of this material as an acceptable delay agent.

Example 68

In the manner of Example 65, delay time was measured for a 40 lb./Mgal. guar fluid as a function of sorbitol level and water temperature. The data are presented in FIG. 1. This data illustrates the ease with which one can change the fluid delay time at any reasonable fluid temperature by adjusting the concentration of sorbitol added to the fluid.

TABLE 4

| EXAMPLE NUMBER | SECOND POLYOL | POLYOL: Boron (mole ratio; x:1) | Boric Acid/ Sodium Hydroxide (lb./Mgal.) | Sodium Gluconate (lb./Mgal.) | pH | DELAY TIME (min.:sec.) |
|---|---|---|---|---|---|---|
| 35. | None | — | 12.5/25 | 40 | — | 0:20 |
| 36. | None | — | 12.5/25 | 40 | — | 0:20 |
| 37. | Fructose | 1.7 | 12.5/25 | 40 | — | 11:00 |
| 38. | Fructose | 2 | 12.5/25 | 20 | 13 | 10:10 |
| 39. | Fructose | 3.8 | 10/25 | 30 | 12.4 | 53:45 |
| 40. | Fructose | 2.5 | 10/25 | 30 | 12.6 | 11:15 |
| 41. | Sorbitol | 0.25 | 12.5/25 | 40 | — | 0:20 |
| 42. | Sorbitol | 0.5 | 12.5/25 | 40 | — | 0:30 |
| 43. | Sorbitol | 1 | 12.5/25 | 40 | 12.4 | 5:30 |
| 44. | Sorbitol | 0.5 | 12.5/25 | 20 | — | 0:30 |
| 45. | Sorbitol | 1 | 12.5/25 | 20 | — | <1:30 |
| 46. | Sorbitol | 0.5 | 10/25 | 20 | 12.9 | 0:30 |
| 47. | Sorbitol | 1 | 10/25 | 20 | 12.9 | 4:30 |
| 48. | Glucoheptonic acid | 2.5 | 10/20 | 20 | 11.8 | >60 |
| 49. | Glucoheptonic acid | 1.25 | 10/20 | 20 | 12.7 | 1:30 |
| 50. | Glucoheptonic acid | 1.25 | 12.5/25 | 20 | 12.7 | 0:25 |
| 51. | Glucoheptonic acid | 1.25 | 12.5/25 | 30 | 12.8 | 1:40 |
| 52. | Rhamnose | 3 | 12.5/25 | 20 | 12.3 | 0:45 |
| 53. | Ribose | 3 | 12.5/25 | 20 | 12.3 | 90 |
| 54. | Ribose | 2 | 12.5/25 | 20 | 12.5 | 6 |
| 55. | Ribose | 1 | 12.5/25 | 20 | 12.2 | 0:15 |
| 56. | Glucuronic acid | 3 | 12.5/25 | 20 | — | >60 |
| 57. | Mannitol | 2 | 12.5/25 | 20 | 12.8 | 28 |
| 58. | Mannitol | 1 | 12.5/25 | 20 | 12.8 | 2 |
| 59. | Mannitol | 1 | 12.5/25 | 30 | 12.9 | 4:40 |
| 60. | Mannitol | 1 | 12.5/25 | 40 | 12.9 | 5 |
| 61. | Mannitol | 1.2 | 10/25 | 20 | 12.9 | 6:10 |
| 62. | Mannitol | 1.2 | 10/25 | 30 | 13.2 | 11 |

Examples 63–67

To a guar solution as described in Example 1 but containing 35 pounds of guar per one thousand gallons was added (1) a solution containing 5.5 pounds boric acid, 13 pounds sodium hydroxide, plus 8 pounds sodiumsesquicarbonate per one thousand gallons and (2) various amounts of glyoxal or sorbitol. The solution was blended as in the case of Example 1 and the delay time determined. The data are presented in Table 5.

This adjustment can be carried out on location as the job is being executed to optimize the delay as appropriate for the reservoir and fluid conditions.

Examples 69–73

These examples were prepared in the manner of Example 65. The data is presented in Table 6. As seen from the final column, these formulations provide fluids with sufficient viscosity for hydraulic fracturing applications (current industry accepted standard is a viscosity of at least 100 cp.

TABLE 5

| Example Number | Delay agent/Amount | pH | Delay Time (min.:sec.) | Observations on gel |
|---|---|---|---|---|
| 63. | 15 lb./Mgal. glyoxal | 12.1 | :20 | Over-crosslinked, chunky gel after 60 min. |
| 64. | 30 lb./Mgal. glyoxal | 11.8 | :50 | Over-crosslinked, chunky gel after 60 min. |
| 65. | 36 lb./Mgal. glyoxal | 11.7 | 1:05 | Over-crosslinked, chunky gel after 60 min. |
| 66. | 15 lb /Mgal sorbitol | 12.4 | 2:00 | Smooth gel for more than 24 hr. |
| 67. | 18 lb./Mgal. sorbitol | 12.3 | 4:30 | Smooth gel for more than 24 hr. | at 100 sec.$^{-1}$) even after at least 4 hours at the end use temperatures ranging from 200° to 300° F. In these fluids, pH was set at 12.3+/−0.3 by use of sodium hydroxide and sodium sesquicarbonate buffer which is present at 8 pounds per one thousand gallons. Sodium thiosulfate antioxidant is also present at ten pounds per one thousand gallons.

TABLE 6

| Example Number | Guar (lb./Mgal.) | Boric Acid/NaOH (lb./Mgal.) | Sorbitol (lb./Mgal.) | Delay time (min.:sec.) | Temperature (°F.) | Viscosity after 4 hrs. (cp.) |
|---|---|---|---|---|---|---|
| 69. | 25 | 5.5/10 | 10 | 2:30 | 200 | 350 |
| 70. | 30 | 5.5/13 | 15 | 3 | 225 | 300 |
| 71. | 35 | 6.3/14.5 | 17.5 | 4 | 250 | 225 |
| 72. | 40 | 6.8/16.5 | 20 | 2:30 | 275 | 350 |
| 73. | 45 | 8.2/19.4 | 25 | 2:10 | 300 | 400 |

Example 74

Example 74 illustrates an experiment using this process with conventional hydraulic fracturing equipment. A hydraulic fracturing treatment was performed using 30–35 pounds of guar per one thousand gallons of fluid. In this treatment, hydrated guar was provided as the major fluid stream. To this stream were added two separate solutions: one solution contained sodium hydroxide and boric acid; the second solution contained an aqueous solution containing about four pounds of sodium gluconate per gallon of water. These two streams were metered separately on-the-fly into the fracturing fluid. The borate stream was added at sufficient rate to provide five pounds of boric acid and 12.5 pounds of sodium hydroxide per one thousand gallons of final fluid. The addition rate of the sodium gluconate was varied. The well was fractured down eleven thousand feet of 2⅞ inch tubing. The reservoir temperature was 245° F. Pump rate was 18 barrels per minute.

The experiment was initiated using a fluid containing 35 pounds of guar per one thousand gallons of fluid without any borate crosslinking agent or delay additive. The treating pressure was 9,200 psi. Then the boron/hydroxide solution and the aqueous sodium gluconate solution were separately added on-the-fly. The sodium gluconate was added at a rate of 15 pounds per one thousand gallons. Delay time was 1.5 minutes (determined from a sample of the fluid using the "hang lip" method) with a treating pressure of 9,760 psi. The rate of addition of the gluconate solution was increased to provide about 20–25 pounds of sodium gluconate per one thousand gallons of fluid. Delay time increased to 5 minutes (determined as before) and treating pressure decreased to 9,300 psi. This experiment demonstrated that separate addition of a polyol delay agent allowed on-the-fly control of borate crosslinked polysaccharide fluid delay time under typical field conditions without modification of fluid pH or boron concentration.

Example 75

To a fully hydrated fluid containing 45 pounds guar per 1,000 gallons of fluid was separately added: (a) an aqueous solution of boric acid, sodium sesquicarbonate and sodium hydroxide at a rate sufficient to provide 9 pounds boric acid, 8 pounds sodium sesquicarbonate, and 20 pounds of sodium hydroxide per 1,000 gallons of total fluid; and (b) an aqueous solution to provide 25 pounds sorbitol per 1,000 gallons. Fluid pH was 12.4. Delay time was 9.5 minutes. This fluid maintained a viscosity greater than 100 cp. at 100 sec.$^{-1}$ at 325° F. for more than 1.5 hrs.

What is claimed is:

1. A method for controlling the delayed borate-crosslinking of a polysaccharide-based fracturing fluid, the method comprising:

providing a hydrated polysaccharide containing cis-hydroxyl groups;

adding a pH control agent to render the fracturing fluid alkaline;

adding a crosslinking agent, wherein the crosslinking agent is capable of releasing at least one borate ion per molecule thereof in the fracturing fluid having an alkaline pH;

adding a polyol delay agent at a first rate to the fracturing fluid to provide a first delay time, wherein the delay agent is capable of complexing with the borate ions in the fracturing fluid having the alkaline pH and wherein the crosslinking agent and the delay agent are added separately to the fracturing fluid;

determining the first delay time; and comparing the first delay time to a preselected delay time, adding the delay agent on-the-fly during pumping sufficient to achieve the preselected delay time.

2. The method of claim 1 wherein the polyol delay agent has at least two hydroxyl groups which are in a cis-orientation thereon and has an equilibrium constant $K_{eq}$ greater than $10^3$.

3. The method of claim 2, wherein the at least one polyol is selected from the group consisting of saccharides and their acid, acid salt, ester, hydrogenation and amine derivatives.

4. The method of claim 3, wherein the saccharide is a monosaccharide.

5. The method of claim 3, wherein the saccharide is an oligosaccharide.

6. The method of claim 3, wherein the saccharide is a polysaccharide.

7. The method of claim 2, wherein the delay agent is selected from the group consisting of arabinose, fructose, mannitol, ribose, sorbitol, xylose, gluconic acid and its salts, glucoheptonic acid and its salts, and combinations thereof.

8. The method of claim 1, wherein the crosslinking agent is selected from the group consisting of boric acid and borax.

9. The method of claim 1, wherein the pH control agent is a hydroxyl ion releasing agent.

10. The method of claim 9, wherein the pH control agent controls the pH in a range of from about 8.5 to 12 is a buffer.

11. A method for controlling the delayed borate-crosslinking of a polysaccharide-based fracturing fluid, the method comprising:

providing a polysaccharide;

adding a first portion of a delay additive delay agent to the polysaccharide;

hydrating the polysaccharide in the presence of the first portion forming a mixture of the hydrated polysaccharide and the first portion;

adding a pH control agent to the mixture to render the fracturing fluid alkaline;

adding a crosslinking agent to the mixture, wherein the crosslinking agent is capable of releasing at least one borate ion per molecule thereof in the fracturing fluid having an alkaline pH;

determining a first delay time;

comparing the first delay time to a preselected delay time;

adding a second portion of the delay agent at a first rate to the fracturing fluid to provide a second delay time; and adding the delay agent on-the-fly during pumping sufficient to achieve the preselected delay time, wherein the delay agent is capable of complexing with the borate ions in the fracturing fluid having the alkaline pH.

12. A method for controlling the delayed borate-crosslinking of a polysaccharide-based fracturing fluid, the method comprising:

providing a hydrated polysaccharide;

adding a pH control agent to render the fracturing fluid alkaline;

providing a pre-formed boron/delay agent complex in the fracturing fluid, wherein the complex is prepared by combining in an alkaline solution;

a crosslinking agent, wherein the crosslinking agent is capable of releasing at least one borate ion per molecule thereof in an alkaline environment and a first portion of a delay agent, wherein the delay agent is capable of complexing with the borate ions in the alkaline environment;

determining a first delay time;

comparing the first delay time to a preselected delay time;

adding a second portion of the delay agent at a first rate to the fracturing fluid to provide a second delay time; and adding the delay agent on-the-fly during pumping sufficient to achieve the preselected delay time.

13. A method for controlling the delayed borate-crosslinking of a polysaccharide-based fracturing fluid comprising:

combining an aqueous solution of a hydrated polysaccharide containing cis-hydroxyl groups, an aqueous solution of crosslinking agent, wherein the crosslinking agent is capable of releasing at least one borate ion per molecule thereof in a fracturing fluid having an alkaline pH, and an aqueous solution of a pH control agent to render the fracturing fluid alkaline;

adding a polyol delay agent at a first rate to the fracturing fluid to provide a first delay time, wherein the polyol delay agent is capable of complexing with the borate ions in the fracturing fluid having the alkaline pH and wherein the crosslinking agent and the polyol delay agent are added separately to the aqueous hydrated polysaccharide containing solution;

determining the first delay time;

comparing the first delay time to a preselected delay time; and adding the polyol delay agent on-the-fly during pumping sufficient to achieve the preselected delay time.

14. The method of claim 13 wherein the polyol delay agent comprises at least one polyol which has at least two hydroxyl groups which are in a cis-orientation thereon and has an equilibrium constant $K_{eq}$ greater than $10^3$.

15. The method of claim 14 wherein the at least one polyol is selected from the group consisting of saccharides and their acid, acid salt, ester, hydrogenation and amine derivatives.

16. The method of claim 14 wherein the pH control agent maintains the pH in a range of from about 8.5 to about 12.

17. The method of claim 14 wherein the polyol delay agent is selected from the group consisting of arabinose, fructose, mannitol, ribose, sorbitol, xylose, gluconic acid and its salts, glucoheptonic acid and its salts, and combinations thereof.

18. The method of claim 14 wherein the polyol delay agent is sorbitol.

19. The method of claim 17 wherein the crosslinking agent is selected from the group consisting of boric acid and borax.

20. The method of claim 18 wherein the crosslinking agent is selected from the group consisting of boric acid and borax.

21. The method of claim 17 wherein the pH control agent maintains the pH in a range of from about 8.5 to about 12.

22. A method for controlling the delayed borate-crosslinking of a polysaccharide-based fracturing fluid comprising combining an aqueous solution of a polysaccharide containing cis-hydroxyl groups and a first portion of a polyol delay agent, the polyol delay agent being capable of complexing with borate ions in a fracturing fluid having alkaline pH; hydrating the polysaccharide in the presence of the first portion forming a mixture of the hydrated polysaccharide and the first portion;

adding a pH control agent to the mixture to render the fracturing fluid alkaline;

adding a crosslinking agent to the mixture, wherein the crosslinking agent is capable of releasing at least one borate ion per molecule thereof in a fracturing fluid having an alkaline pH;

determining a first delay time;

comparing the first delay time to a preselected delay time;

adding a second portion of the polyol delay agent at a first rate to the fracturing fluid to provide a second delay time, and adding the delay agent on-the-fly during pumping sufficient to achieve the preselected delay time.

23. A method for controlling the delayed borate-crosslinking of a polysaccharide-based fracturing fluid, the method comprising combining an aqueous solution of a hydrated polysaccharide containing cis-hydroxyl groups, an aqueous solution of a pH control agent to render the fracturing fluid alkaline, and a preformed polyol boron/delay agent complex in the fracturing fluid, wherein the complex is prepared by combining in an alkaline solution a crosslinking agent, wherein the crosslinking agent is capable of releasing at least one borate ion per molecule thereof in an alkaline environment;

and a first portion of a polyol delay agent, wherein the polyol delay agent is capable of complexing with the borate ions in the alkaline environment;

determining a first delay time;

comparing the first delay time to a preselected delay time;

adding a second portion of the polyol delay agent at a first rate to the fracturing fluid to provide a second delay time; and adding the delay agent on-the-fly during pumping sufficient to achieve the preselected delay time.

24. The method of claim 22 wherein the polyol delay agent is selected from sodium gluconate, sorbitol, and mannitol.

25. The method of claim 24 wherein the polysaccharide comprises guar.

26. The method of claim 21 wherein the polysaccharide comprises guar.

\* \* \* \* \*